United States Patent [19]
Stark et al.

[11] Patent Number: 6,028,268
[45] Date of Patent: Feb. 22, 2000

[54] OUTDOOR ELECTRICAL ENCLOSURE

[75] Inventors: Thomas S. Stark, Coral Springs, Fla.; Thomas J. Gretz, Clarks Summit, Pa.

[73] Assignee: Arlington Industries, Inc., Scranton, Pa.

[21] Appl. No.: 08/910,036

[22] Filed: Aug. 12, 1997

Related U.S. Application Data

[63] Continuation of application No. 08/212,976, Mar. 15, 1994, abandoned.

[51] Int. Cl.[7] .................................................. H05K 5/03
[52] U.S. Cl. ............................................. 174/67; 220/242
[58] Field of Search ............................... 174/50, 57, 66, 174/67, 58; 220/3.7, 241, 242, 3.8; 439/147

[56] References Cited

U.S. PATENT DOCUMENTS

| | | |
|---|---|---|
| 3,437,738 | 4/1969 | Wagner ................................. 174/66 X |
| 3,686,425 | 8/1972 | Zerwes ...................................... 174/53 |
| 4,223,796 | 9/1980 | Silver .................................. 220/3.7 X |
| 4,322,773 | 3/1982 | Bordner ............................... 174/58 X |
| 4,381,063 | 4/1983 | Leong ................................... 220/242 |
| 4,593,541 | 6/1986 | Hollis ...................................... 70/57 |
| 4,988,832 | 1/1991 | Shotey .................................... 174/67 |
| 5,148,348 | 9/1992 | White .................................... 361/356 |
| 5,171,939 | 12/1992 | Shotey .................................... 174/67 |
| 5,228,584 | 7/1993 | Williams, Jr. ........................... 220/3.8 |
| 5,245,507 | 9/1993 | Ericksen ................................ 361/641 |
| 5,389,740 | 2/1995 | Austin .................................... 174/67 |
| 5,456,373 | 10/1995 | Ford ...................................... 220/242 |

*Primary Examiner*—Dean A. Reichard

[57] ABSTRACT

This invention consists of a water resistant electrical box that may be provided in four basic configurations, ½" vertical, ¾" vertical, ½" horizontal and ¾" horizontal. The box is designed with a special picture frame that is designed to accommodate all standard electrical outlet, switch, timer, thermostat, or other plates that are commonly used in outdoor electrical service applications. Neither special plates nor gaskets are required with the installation.

1 Claim, 7 Drawing Sheets

OUTDOOR ELECTRICAL ENCLOSURE

This application is a continuation of application Ser. No. 08/212,976, filed Mar. 15, 1994 now abandoned.

FIELD OF THE INVENTION

This invention relates to outdoor electrical boxes, and particularly, to an improved electrical box that can accommodate any standard outlet plate.

BACKGROUND OF THE INVENTION

Outdoor electrical outlets are commonly used to provide electrical service near gardens, swimming pools, patios and the like. They are also used to provide a weatherproof enclosure for mounting thermostats, timers for watering systems, and switches outdoors. These outdoor enclosures are commonly referred to in the industry as FS or field service boxes.

Presently, the most popular form of Field Service (FS) box requires that the installer purchase special mounting plates, manufactured specifically for that particular box, to configure the enclosure for the particular type of electrical service that is required. As many as approximately 50 different plates must be manufactured to provide for all the different types of electrical service that may be required in typical outdoor wiring applications. The requirement to purchase a special plate increases the expense of the device and also requires the electrical distributor to increase inventory in order to stock all these special plates.

The first advantage of this box is that it is designed to provide the same functionality of FS boxes but with only 4 different configurations to accommodate all the various common outdoor electrical applications. The second advantage is that special mounting plates are not required. Standard face plates as are provided in any electrical supply store may be used with the FS box of this invention.

SUMMARY OF THE INVENTION

This invention consists of an FS box that may be provided in four basic configurations, ½" vertical, ¾" vertical, ½" horizontal and ¾" horizontal. The box is designed with a special picture frame that is designed to accommodate all standard electrical outlet, switch, timer, thermostat, or other plates that are commonly used in outdoor electrical service applications. Special plates are therefore not required with the installation.

OBJECTS AND ADVANTAGES

The first object of this invention to provide a simple FS box that may be installed using standard electrical devices which may be purchased in any electrical supply store. The standard devices are simply installed by mounting with screws to the picture frame within the FS box that is designed to accommodate them.

A second advantage of this invention is that only four basic configurations are required to accommodate all common outdoor electrical applications for FS boxes. The four configurations are ½" vertical, ¾" vertical, ½" horizontal and ¾" horizontal.

A third advantage of this invention is that a gasket is not required when attaching standard electrical devices to the picture frame of the FS box. Most outdoor electrical boxes require the use of gaskets but the FS box of this invention eliminates the need to install a gasket.

Other objects and advantages of the present invention will be better understood from the following description when read in conjunction with the appropriate drawings.

DESCRIPTION OF THE INVENTION

The invention is an improved FS box. Three separate parts; the enclosure, the picture frame, and the cover are interconnected to comprise the box.

Figure 1:
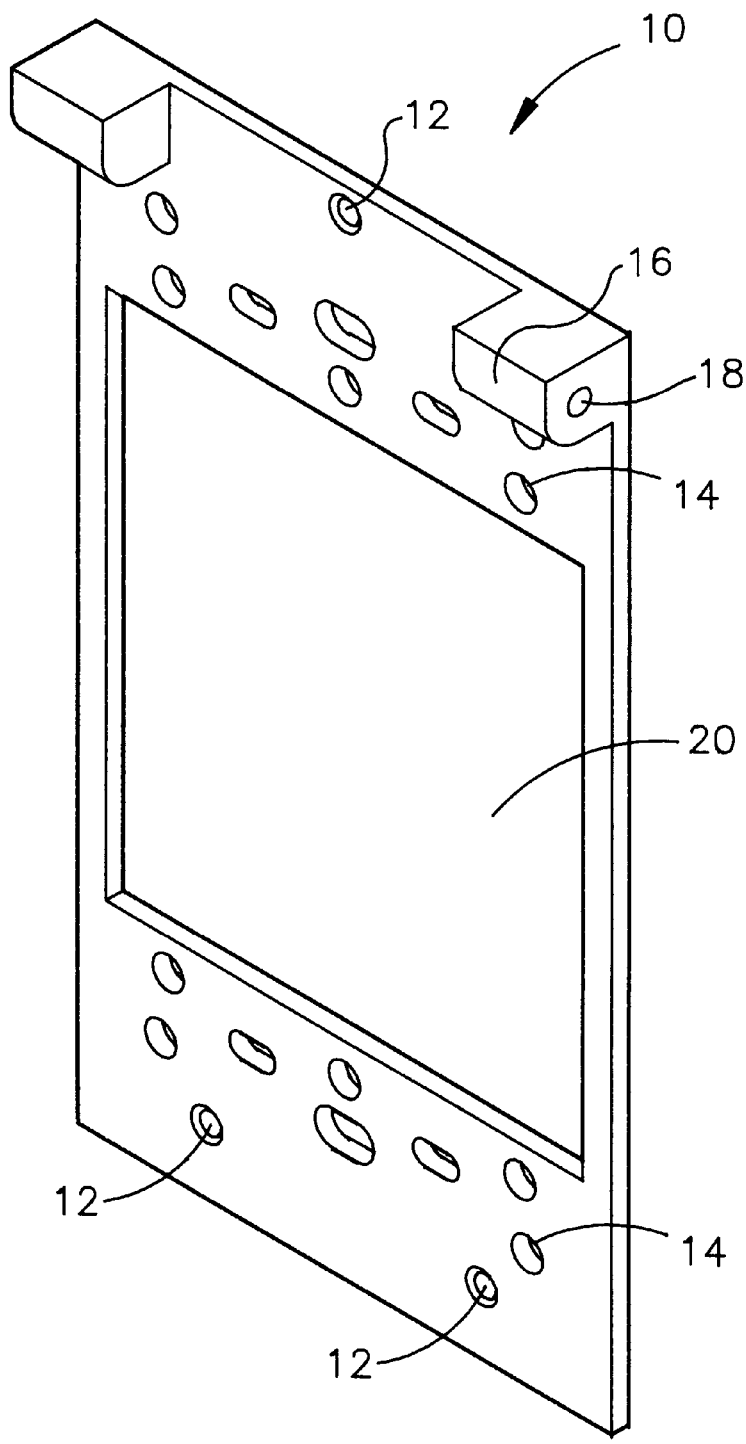
FIG. 1 is a perspective view of the picture frame of the present invention that shows the special design that allows the use of standard electrical devices.

FIG. 1 is a perspective view of the picture frame face plate 10 which will be connected to the enclosure by screws through counterbored holes 12 in the outer periphery of the frame. Sixteen separate holes 14 are provided in each end of the picture frame face plate 10 to allow connection of the many various electrical devices that would typically be used in an FS box. These holes 14 are located and sized specifically to accommodate connection of the various electrical outlets, switches, ground fault interrupts, timers, and other devices that would normally be mounted in an FS box.

The picture frame face plate 10 shown in FIG. 1 has a periphery and a substantially rectangular opening or window 20 that is of an area that covers most of the area inside the periphery and is surrounded by top, right, bottom and left flat sides. It also has ears 16 as an integral part of the frame containing holes 18 for accommodating a pin which will act as a hinge for the cover.

The preferred material of construction of the picture frame face plate 10 is 0.093 inch thick zamak. The picture frame face plate 10 should be electrically conductive but need not necessarily be so. The picture frame 10 could therefore be constructed of a wide range of materials other than the zamak, including plastic, brass, aluminum, or malleable iron.

Figure 2:
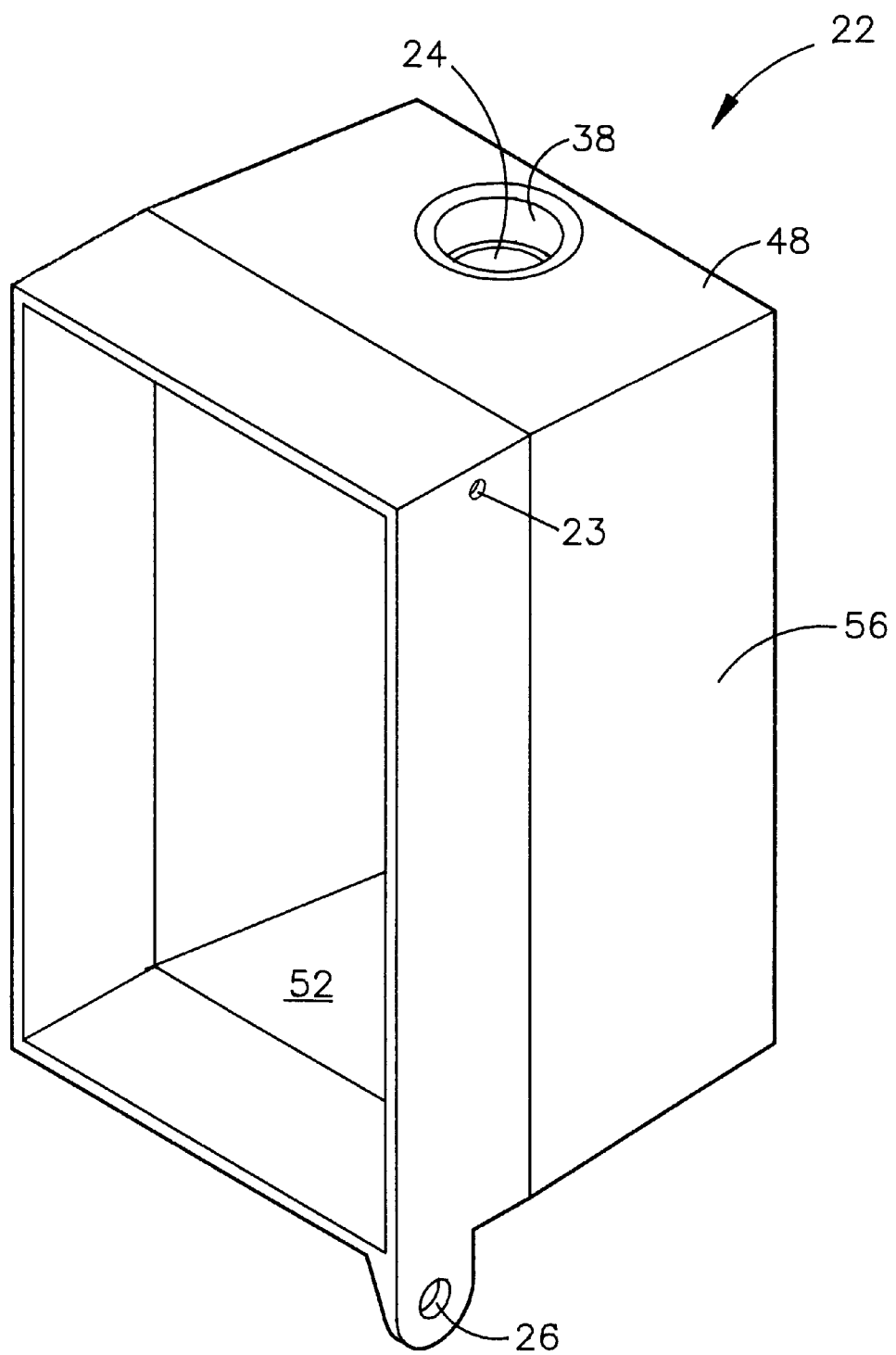
FIG. 2 is a perspective view of the FS box or container with some of the details omitted for clarity.

A perspective view of the FS box enclosure 22 is shown in FIG. 2 with some of the details omitted for clarity. The enclosure 22 is depicted with side surface 50 and top surface 48 in view. A lead-in 38 is depicted in the top surface 48 of enclosure 22 for the connection of the raceway which will attach to the FS enclosure at one of the three locations. In addition to the top lead-in 38, a lead-in is provided in the bottom surface 52 and one in the rear surface of the box. Two holes 23 (only one is shown) opposite one another are provided to receive a hinge pin.

The preferred material of construction of the enclosure 22 is 0.093 inch thick aluminum. The enclosure 22 can also be constructed of numerous other materials, including zamak, plastic, brass, or malleable iron.

Figure 3:
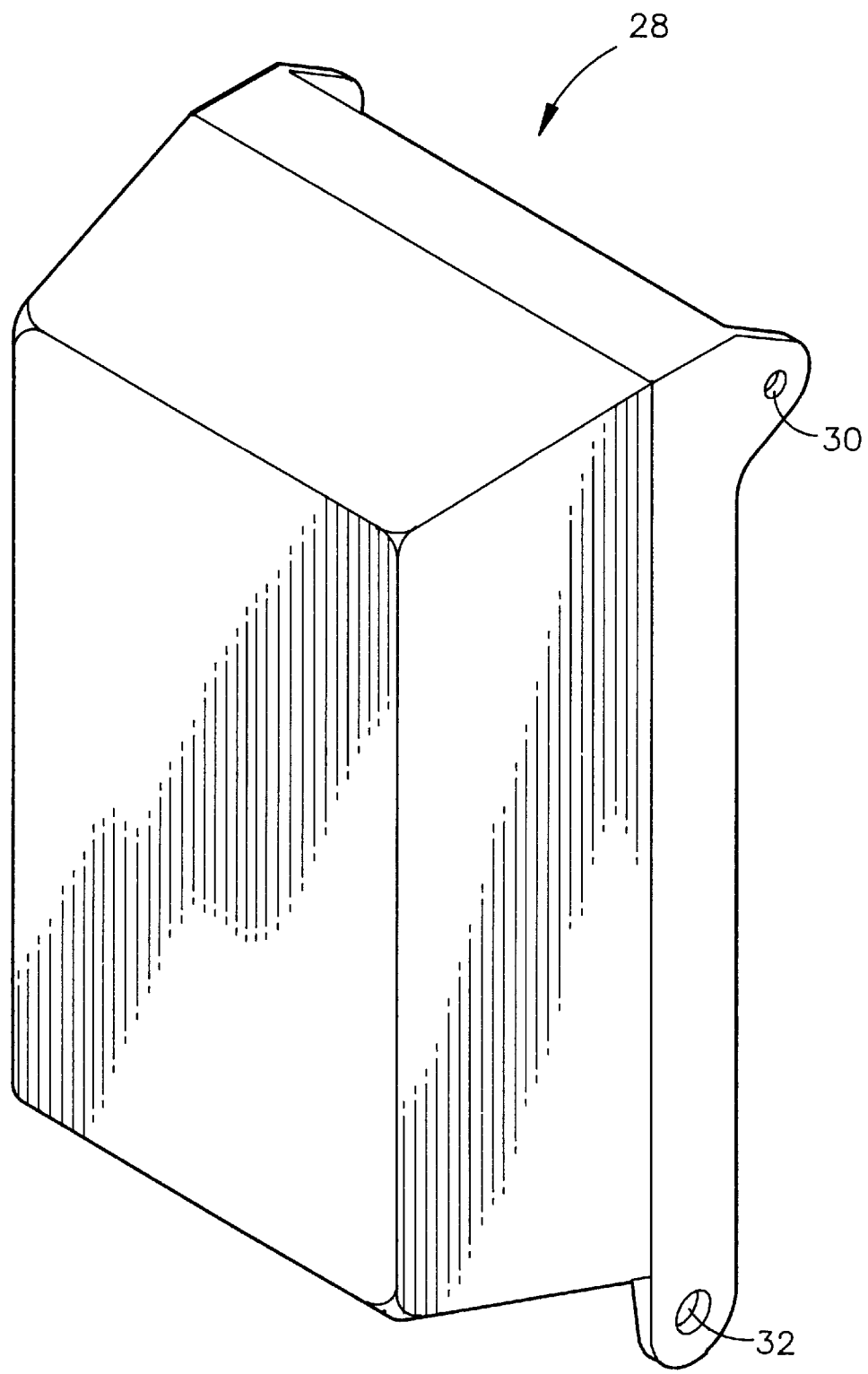
FIG. 3 is a perspective view of the FS box cover.

A perspective view of the cover 28 for the FS box is shown in FIG. 3. A hole 30 is provided in the top corner of the cover for accommodating the hinge. A lock hole 32 is provided in the cover for locking the cover to the FS box.

The preferred material of construction of the cover 28 is zamak. Alternately, the cover 28 may be constructed of plastic, aluminum, brass, or malleable iron.

Figure 4:
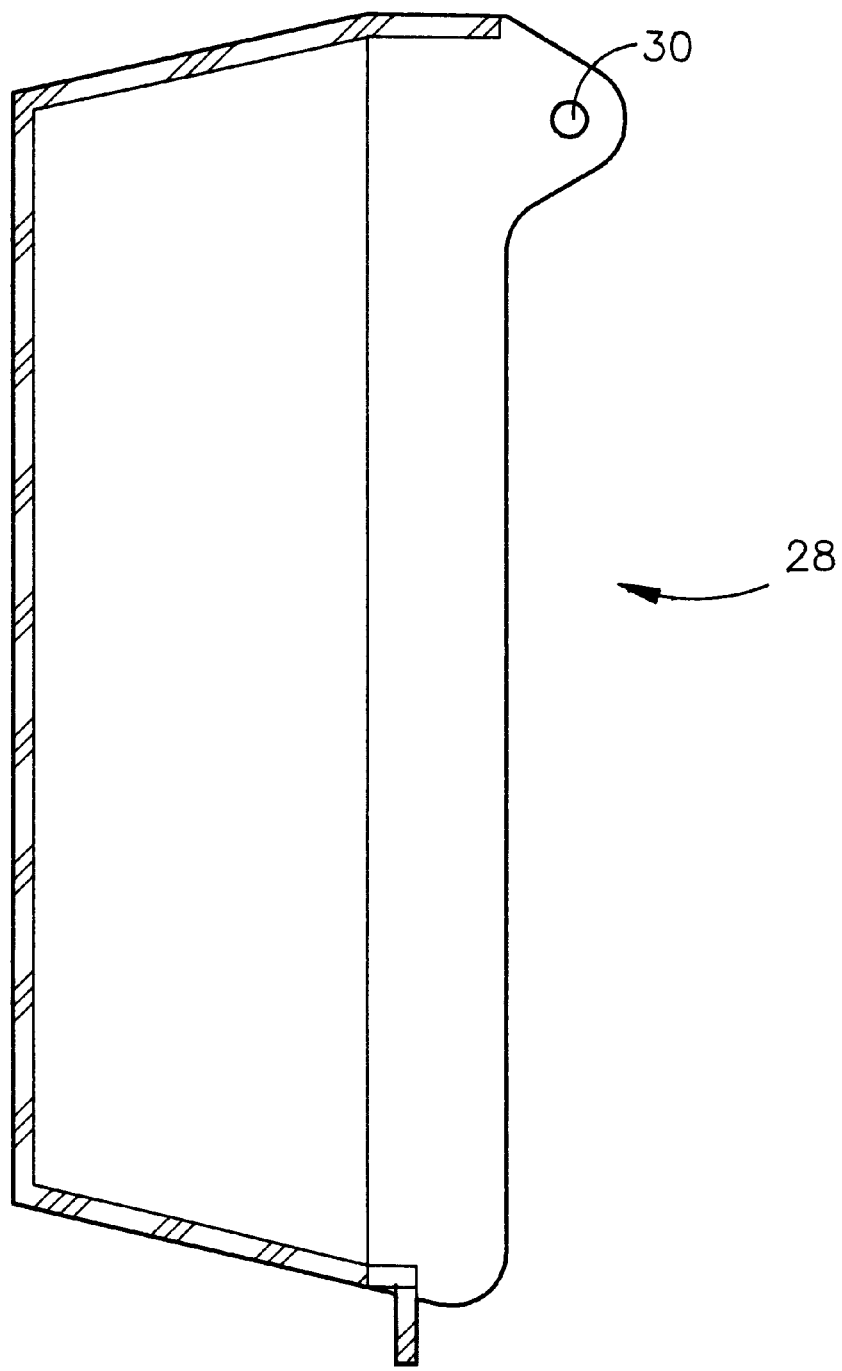
FIG. 4 is a sectional side view of the FS box cover.

A sectional view of the FS box cover is shown in FIG. 4 with the hinge pin hole in the cover 30 shown in the upper right corner of the drawing."

Figure 5:
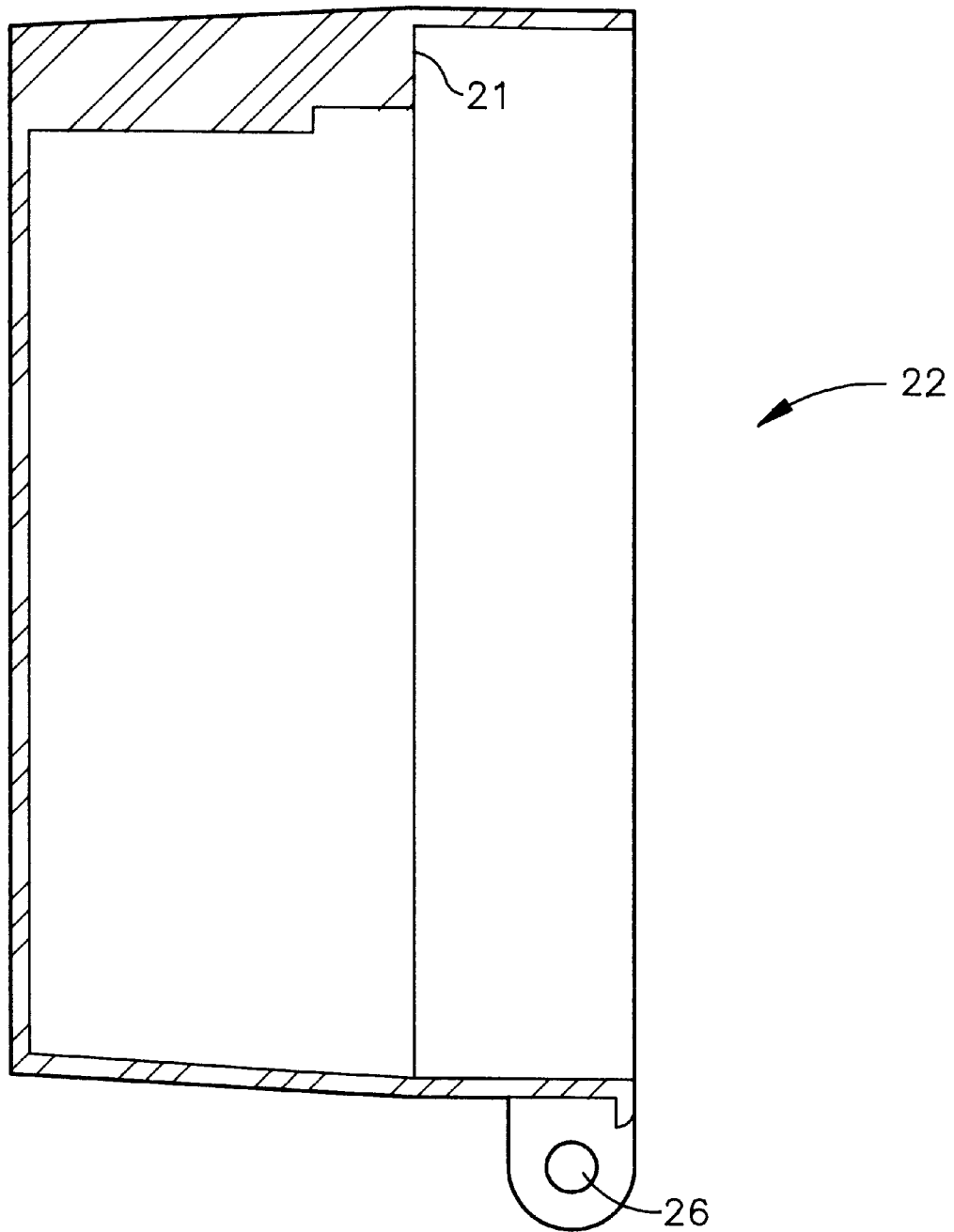
FIG. 5 is a sectional side view of the FS box with some of the details omitted for clarity.

FIG. 5 is a sectional view of the FS enclosure 22 showing the lock hole 26 which will mate with the lock hole in the cover when the two pieces are mated. FIG. 5 also shows a shoulder 21 of tab 44 against which the face plate 10 lays when in position. Some of the threaded bosses, tabs, etc., are omitted from FIG. 5 for purposes of clarity.

Figure 6:
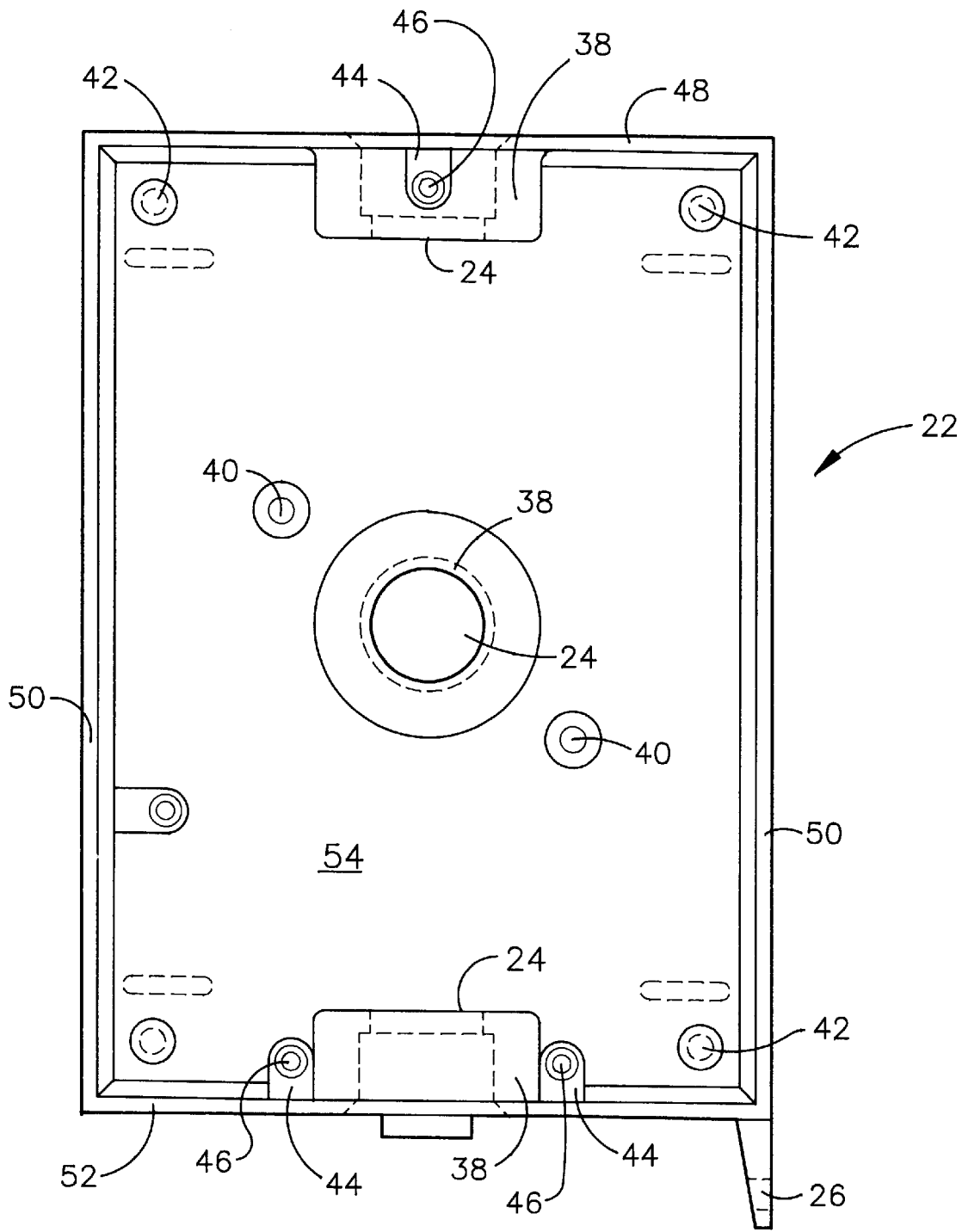
FIG. 6 is a frontal view of the FS box.

FIG. 6 is frontal view of the FS enclosure 22. The FS enclosure is depicted with a top 48, two sides 50, a bottom 52, and a back surface 54. Lead-ins 38 are provided for the raceways or conduits in the top 48, the back 54, and the bottom 52 of the enclosure. Knock-outs 24, which can be left in place or removed for connection of a raceway or conduit, are located at the inner periphery of the lead-ins 38. Four bosses 42, pictured in each corner in the back surface, are used for attaching mounting straps for mounting the FS box to a round surface such as a pole. The FS box may also be attached to a flat surface by using nails or screws through flush-mount holes 40. Three tabs 44 containing threaded holes 46 are provided for attaching the picture frame face plate to the FS enclosure. The lock hole 26 is shown in phantom lines in the bottom right side of FIG. 6.

Figure 7:
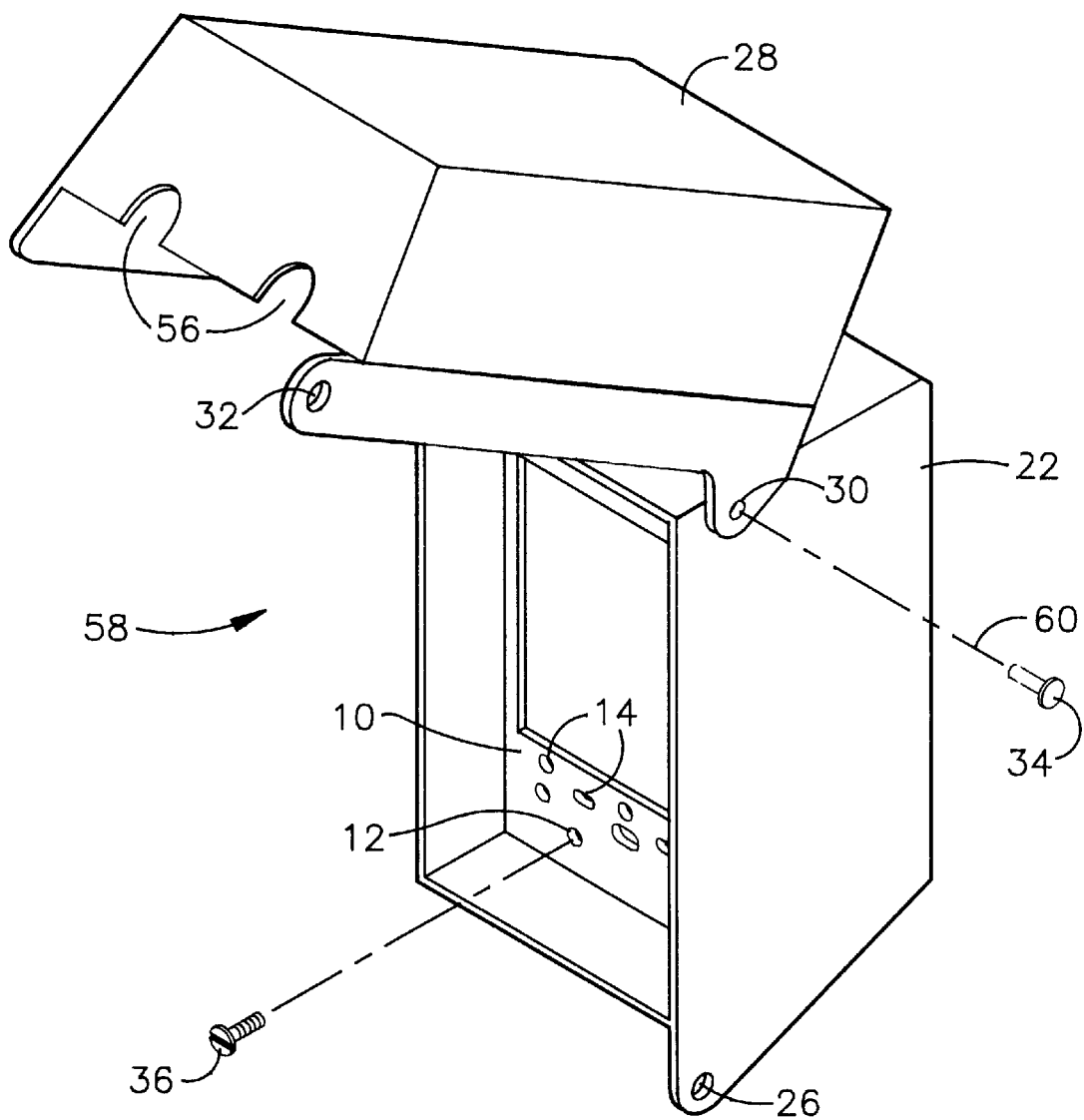
FIG. 7 is a perspective view of the FS box, cover, and picture frame assembled with the cover in the open position.

FIG. 7 depicts the invention, the FS box 58 which is comprised of the cover 28, the picture frame face plate 10, and the enclosure 22. The picture frame face plate 10 is connected to the enclosure 22 by three screws 36, one of which is depicted in FIG. 7 connecting through hole 12 in the frame. The cover 28 is connected pivotally around axis 60 by two hinge pins 34 having enlarged heads which pass through holes 30 in cover 28, through enclosure 22, and into the hinge pin hole in the picture frame. The pins 34 are smaller in diameter than holes 30 so that cover 28 is free to pivot thereabout. However, the holes 18 in the face plate and holes 23 in the box enclosure 22 are smaller in diameter than pins 34 so that there is an interference fit that resists the removal of the pins 34 after they have been press fitted into holes 23 and 18. Holes 23 and 18 are aligned on the same axis 60 with one another so that the pins 34 have a double function of not only providing an axle for the cover to pivot about, but also holds face plate 10 in enclosure 22.

Also depicted in FIG. 7 are some of the holes 14 in the picture frame face plate for mounting standard plates and electrical devices to the frame. When the cover 28 is in the closed position, a lock hole is formed by hole 32 in cover 28 mating with hole 26 in the FS enclosure 22. Two cutouts or notches 56 are provided in the end of the cover 28 to allow for passage or outlet of electrical cords when the FS box is configured as an outlet box.

In operation, the FS box 58 is provided in one piece with the picture frame 10 and the cover 28 attached to the enclosure 22. The FS box may be mounted to a round object such as a pole by using straps anchored to bosses 42 in FIG. 6. The FS box may also be flush mounted to a flat surface by using nails or screws attached into the flat surface through flush mount holes 60 in FIG. 6.

After the FS box is anchored in place, raceways or conduits can be run to one of the three lead-ins 38 provided in the enclosure 22 shown in FIG. 6, whichever is most convenient to the application. Cable is then pulled through the raceway or conduit and into the enclosure. Leads can then be terminated to any type of electrical device that is needed in a given application, such as a duplex outlet, a timer, a thermostat, a switch, a twist-lock outlet, or a ground fault interrupt outlet. The design of the picture frame face plate within the confines of the FS box allows use of any of the standard electrical devices that are stocked by electrical supply stores. It is not required to purchase electrical devices that are designed or configured specifically for the FS box of this invention.

As the FS box of this invention accommodates standard off the shelf electrical devices, only four basic configurations of the FS box need be provided, these being the ½ inch vertical box, the ¾ inch vertical box, the ½ inch horizontal box, and the ¾ inch horizontal box. The ½ inch and ¾ inch refer to the two common trade sizes of the pipe threads used to connect fittings or raceways to the FS box. The ½ inch boxes are provided to allow connection to the ½ inch fittings or raceways. The ¾ inch boxes are provided to allow connection to ¾ inch fittings or raceways. Each size is available in either a vertical configuration as shown in the figures or a horizontal configuration (not shown) to allow placement in a given application as desired, with the cover hinged along the short or the long side of the FS box.

Although there has been shown and described an example of what is at present considered the preferred embodiment of the present invention, it will be obvious to those skilled in the art that various changes and modifications may be made therein without departing from the scope of the invention as defined by the appended claims.

What is claimed is:

1. A water resistant electrical enclosure comprising:

an electrical enclosure having two vertical sides each having an outside and an inside, a top side having an outside and an inside, and a bottom side;

a face plate of generally rectangular shape having a periphery, two ends and two sides recessed in said electrical enclosure;

holes on said ends for attaching said face plate to said electrical enclosure;

a substantially rectangular window within said periphery of said face plate and having an area that covers most of the area inside said periphery;

a plurality of holes in each of said ends of said face plate for mounting a variety of said electrical devices selected from the group consisting of switches, receptacles, ground fault interrupts, and timers;

a cover having an open position and a closed position having two vertical sides, a top side and a bottom side to cover said face plate and enclosure with said two vertical sides and said topside of said cover overlapping said outside of said two vertical sides and said topside of said enclosure when in said closed position;

said face plate has a planar surface and has two raised areas, each protruding in the same direction from its planar surface and containing holes therein;

two holes in said enclosure aligned with said holes in said face plate;

two holes in said cover aligned with said holes in said face plate and said holes in said enclosure; and two hinge pins fitted into said holes in said face plate and enclosure with ends of said hinge pins located in said holes in said cover for pivotally connecting said cover to said enclosure.

* * * * *